(12) United States Patent
Schneider

(10) Patent No.: US 8,326,448 B2
(45) Date of Patent: Dec. 4, 2012

(54) METHOD AND DEVICE FOR OPERATING A MACHINE TOOL

(75) Inventor: Roland Schneider, Erlangen (DE)

(73) Assignee: Siemens Aktiengesellschaft, München (DE)

( * ) Notice: Subject to any disclaimer, the term of this patent is extended or adjusted under 35 U.S.C. 154(b) by 440 days.

(21) Appl. No.: 12/267,987

(22) Filed: Nov. 10, 2008

(65) Prior Publication Data
US 2009/0198366 A1    Aug. 6, 2009

(30) Foreign Application Priority Data

Nov. 12, 2007 (EP) ..................................... 07021943

(51) Int. Cl.
*G06F 19/00* (2011.01)

(52) U.S. Cl. ........ 700/110; 700/173; 700/174; 700/180; 703/7; 703/26; 703/27

(58) Field of Classification Search .................. 700/110, 700/173, 174, 175, 180; 703/26, 27
See application file for complete search history.

(56) References Cited

U.S. PATENT DOCUMENTS

| | | | | |
|---|---|---|---|---|
| 3,686,639 A * | 8/1972 | Fletcher et al. | ................. | 703/14 |
| 3,895,354 A * | 7/1975 | Kish | ............................... | 700/87 |
| 4,309,600 A * | 1/1982 | Perry et al. | .................... | 235/375 |
| 4,531,182 A * | 7/1985 | Hyatt | ........................... | 700/180 |
| 4,636,938 A * | 1/1987 | Broome | ....................... | 700/180 |
| 4,742,444 A * | 5/1988 | Gose et al. | ....................... | 700/37 |
| 5,079,713 A * | 1/1992 | Kawamura et al. | ........... | 700/178 |
| 5,150,305 A * | 9/1992 | Sekikawa | ...................... | 700/184 |
| 5,691,909 A * | 11/1997 | Frey et al. | ..................... | 700/159 |
| 5,822,207 A * | 10/1998 | Hazama et al. | .................. | 700/97 |
| 5,864,482 A * | 1/1999 | Hazama et al. | .................. | 700/95 |
| 5,920,483 A * | 7/1999 | Greenwood et al. | .......... | 700/193 |
| 6,212,441 B1 * | 4/2001 | Hazama et al. | ............... | 700/182 |
| 6,243,611 B1 * | 6/2001 | Hazama et al. | .................. | 700/97 |
| 6,341,996 B1 * | 1/2002 | Brien et al. | ....................... | 451/8 |

(Continued)

FOREIGN PATENT DOCUMENTS

EP    1 186 976 A2    3/2002

(Continued)

OTHER PUBLICATIONS

Feldmann, K.; Schonherr, U. and Zeller, J., "Multisensor Integration for Sensor Guided Robots", Sep. 1994, Proceedings of the IEEE/RSJ/GI Intl Conference on Intelligent Robots and Systems, IEEE Xplore Digital Library.*

(Continued)

*Primary Examiner* — Mohammad Ali
*Assistant Examiner* — Kelvin Booker
(74) *Attorney, Agent, or Firm* — Henry M. Feiereisen LLC

(57) ABSTRACT

A method and a device for operating a machine tool are disclosed, wherein a machining operation of the machine tool is controlled by a parts program by storing a simulated configuration of the machine tool in the parts program, determining an actual configuration of the machine tool, comparing the actual configuration with the simulated configuration of the machine tool stored in the parts program, and generating a warning message if the actual configuration is not in conformance with the simulated configuration. This prevents errors in the machining process resulting from a discrepancy between the configuration of the machine tool used in the simulation of the parts program and the configuration of the actual machine tool during the actual machining operation.

13 Claims, 1 Drawing Sheet

U.S. PATENT DOCUMENTS

| | | | |
|---|---|---|---|
| 6,349,237 B1* | 2/2002 | Koren et al. | 700/96 |
| 6,477,683 B1* | 11/2002 | Killian et al. | 716/106 |
| 6,608,282 B2* | 8/2003 | Tomlinson et al. | 219/121.82 |
| 6,642,470 B2* | 11/2003 | Tricarico et al. | 219/69.17 |
| 6,760,888 B2* | 7/2004 | Wang et al. | 716/102 |
| 6,856,853 B2* | 2/2005 | Takahashi et al. | 700/178 |
| 6,901,309 B2* | 5/2005 | Hertinger | 700/174 |
| 6,954,680 B2* | 10/2005 | Kreidler et al. | 700/9 |
| 7,020,854 B2* | 3/2006 | Killian et al. | 716/102 |
| 7,110,853 B2* | 9/2006 | Munz et al. | 700/187 |
| 7,127,322 B2* | 10/2006 | Kreidler et al. | 700/19 |
| 7,149,668 B2* | 12/2006 | Schwanecke et al. | 703/7 |
| 7,155,303 B2* | 12/2006 | Sagasaki et al. | 700/173 |
| 7,174,225 B2* | 2/2007 | Dolansky | 703/7 |
| 7,197,372 B2* | 3/2007 | Hazama | 700/118 |
| 7,331,739 B2* | 2/2008 | Yoshida et al. | 700/175 |
| 7,376,480 B2* | 5/2008 | Hagen et al. | 700/118 |
| 7,536,235 B2* | 5/2009 | Hagen | 700/119 |
| 7,552,203 B2* | 6/2009 | Giles et al. | 709/223 |
| 7,567,853 B2* | 7/2009 | Kreidler et al. | 700/96 |
| 7,729,789 B2* | 6/2010 | Blevins et al. | 700/83 |
| 7,747,421 B2* | 6/2010 | Tang et al. | 703/7 |
| 7,769,481 B2* | 8/2010 | Tang et al. | 700/179 |
| 7,933,678 B2* | 4/2011 | Diezel et al. | 700/51 |
| 8,090,557 B2* | 1/2012 | Koch et al. | 703/1 |
| 8,126,585 B2* | 2/2012 | Yamaguchi | 700/178 |
| 2002/0038163 A1* | 3/2002 | Hazama | 700/165 |
| 2003/0014149 A1* | 1/2003 | Kreidler et al. | 700/9 |
| 2003/0023435 A1* | 1/2003 | Josephson | 704/235 |
| 2003/0045947 A1* | 3/2003 | Wampler | 700/32 |
| 2004/0102872 A1* | 5/2004 | Schick et al. | 700/286 |
| 2004/0225405 A1* | 11/2004 | Takahashi et al. | 700/178 |
| 2005/0071802 A1* | 3/2005 | Brakelmann et al. | 700/87 |
| 2005/0085940 A1* | 4/2005 | Griggs et al. | 700/181 |
| 2005/0171629 A1* | 8/2005 | Suh et al. | 700/159 |
| 2006/0058907 A1* | 3/2006 | Suderman | 700/184 |
| 2006/0129270 A1* | 6/2006 | Pankl et al. | 700/182 |
| 2006/0259878 A1* | 11/2006 | Killian et al. | 716/1 |
| 2007/0093930 A1* | 4/2007 | Griggs et al. | 700/181 |
| 2007/0150080 A1* | 6/2007 | Hagen | 700/56 |
| 2007/0150087 A1* | 6/2007 | Tang et al. | 700/119 |
| 2007/0150089 A1* | 6/2007 | Dolansky et al. | 700/173 |
| 2007/0184428 A1* | 8/2007 | Fabris et al. | 700/17 |
| 2008/0058982 A1* | 3/2008 | Gray | 700/159 |
| 2008/0058984 A1* | 3/2008 | Gray et al. | 700/192 |
| 2008/0091394 A1* | 4/2008 | Hahn et al. | 703/7 |
| 2008/0275589 A1* | 11/2008 | Hacklander et al. | 700/159 |
| 2008/0281463 A1* | 11/2008 | Suh et al. | 700/182 |
| 2008/0306620 A1* | 12/2008 | Mutscheller | 700/109 |
| 2009/0069905 A1* | 3/2009 | Diezel et al. | 700/32 |
| 2009/0259444 A1* | 10/2009 | Dolansky et al. | 703/2 |
| 2009/0299509 A1* | 12/2009 | Diezel et al. | 700/97 |
| 2010/0121478 A1* | 5/2010 | Jahn et al. | 700/173 |
| 2010/0274380 A1* | 10/2010 | Gray | 700/104 |

FOREIGN PATENT DOCUMENTS

| | | | |
|---|---|---|---|
| JP | | 61095407 A | 5/1988 |

OTHER PUBLICATIONS

Fleischer, J. and Wieser, J., "Modularization and Simulation-Based Optimization of Work Piece Handling in Manufacturing Cells", Jul. 2007, IET Intl Conference on Agile Manufacturing, IEEE Xplore Digital Library.*

Li, G.; Wu, B; Gong, J.; Zhong, N. and Li, T., "Research on Digitized Configuration and Automated Management of Cutting Tools for CNC Machines", Nov. 2006, Intl Technology and Innovation Conference, 2006, IEEE Xplore Digital Library.*

Harrison, R.; Wright, C.D.; Booth, A.H.; Carrott, A.J.; Armstrong, N. and West,A.A., "IMDC: An Integrated Environment for the Design and Control of Manufacturing Machines", Feb. 1996. IEE Colloquium on Physical Modelling as a Basis for Control (Digest No. 1996/042).*

Takeuchi, Y.; Sawada, K. and Sata, T., "Computer Aided Ultra-Precision Micron-Machining of Metallic Materials", May 1995, Proceedings of the 1995 IEEE Intl Conference on Robotics and Automation, IEEE Xplore Digital Library.*

Tan, E.; Kumar, A.; Fuh, J. and Nee, A., "Modeling, Analysis and Verification of Optimal Fixturing Design", Oct. 2004, IEEE Transactions on Automation Science and Engineering, vol. 1, No. 2, IEEE Xplore Digital Library.*

* cited by examiner

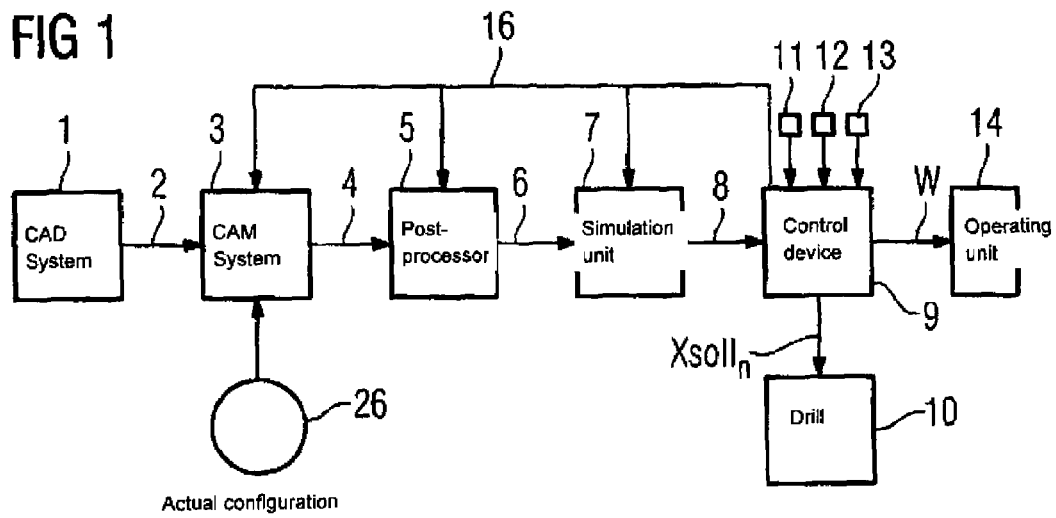
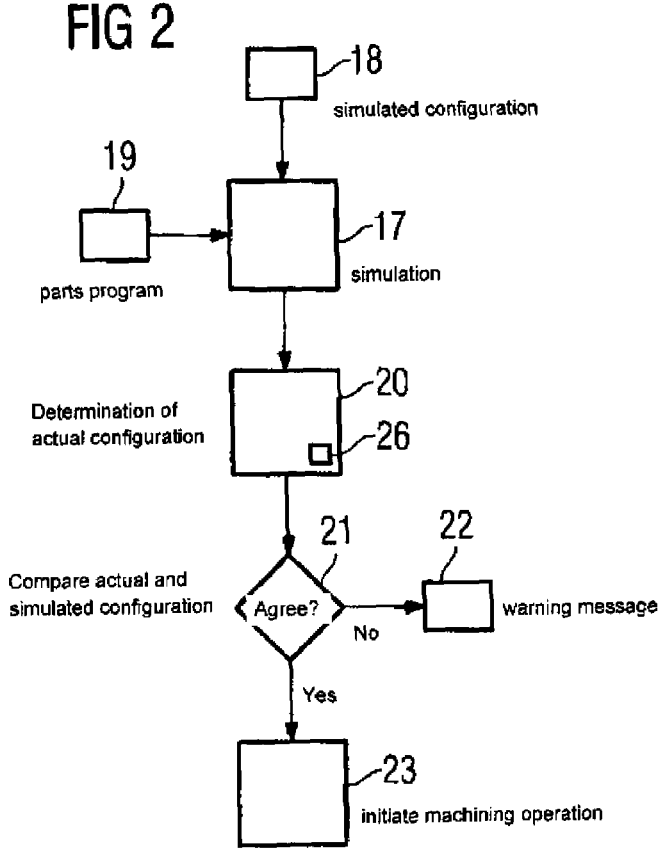
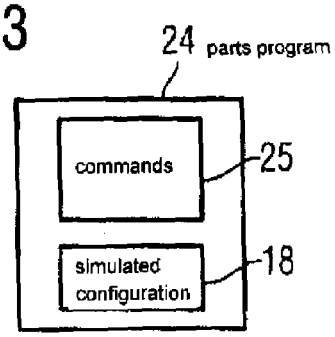

METHOD AND DEVICE FOR OPERATING A MACHINE TOOL

CROSS-REFERENCES TO RELATED APPLICATIONS

This application claims the priority of European Patent Application, Serial No. 07021943, filed Nov. 12, 2007, pursuant to 35 U.S.C. 119(a)-(d), the content of which is incorporated herein by reference in its entirety as if fully set forth herein.

BACKGROUND OF THE INVENTION

The present invention relates to a method and a device for operating a machine tool.

Nothing in the following discussion of the state of the art is to be construed as an admission of prior art.

In order to reliably prevent collisions, the machining time and the freedom from errors in parts programs for manufacturing workpieces by machine tools, it has become increasingly common to simulate parts programs, which include a model of the real machine tool, prior to the actual real machining operation on the real machine tool. Only after the simulation has been carried out successfully is the parts program transferred to the real machine tool, and the machining operation is controlled using the parts program.

However, the simulation can only provide additional safety with respect to the criteria of absence of collisions, machining time and freedom from errors if the configuration of the modeled machine tool in the simulation conforms to the actual configuration of the machine tool, i.e., the actual configuration of the real machine tool present at the time of the machining operation.

Examples for such a configuration are:
1. tool-equipment data, for example in form of tool dimensions, tool holder geometries and magazines used in the tool change,
2. blank data, such as the position and geometry of the blank,
3. tool clamping piece data such as the position and geometry of the clamping pieces for clamping the blank,
4. software configuration, for example in form of control software version and/or parameterizations of the control and drives.

The confidence instilled by the "successful" simulation in the quality of the parts program tested by such means, and the demand for ever faster production times, often causes in practice further tests on the real machine tool (for example, carrying out the machining operation with a markedly reduced feed) to be eliminated. However, the actual configuration, i.e. the configuration of the machine tool actually present at the time of the pending machining operation, often does not correspond to the configuration used in the simulation (referred to below as the simulated configuration). In a worst case scenario, a "successfully" simulated parts program may therefore still cause damage to the real machine tool or costly workpiece rejects. Additionally, incorrectly calculated machining times lead to a deterioration in the ability to plan cycle times and machine movements.

It would therefore be desirable and advantageous to develop an improved method and a device for operating a machine tool to obviate prior art shortcomings and to avoid, during a machining process, faults caused when the configuration of the machine tool used to simulate the parts program does not conform to the configuration of the real machine tool during the real machining operation.

SUMMARY OF THE INVENTION

According to one aspect of the invention, in a method for operating a machine tool, a machining operation of the machine tool can be controlled by means of a parts program, wherein an actual configuration of the machine tool is determined, wherein the actual configuration is compared to a simulated configuration of the machine tool stored in the parts program, wherein a warning message is generated in the case where the actual configuration does not conform to the simulated configuration.

According to another aspect of the invention, a device for operating a machine tool controls the machining operation of the machine tool by means of a parts program, wherein the device is designed such that an actual configuration of the machine tool can be determined by the device and the device can compare the actual configuration to a simulated configuration of the machine tool stored in the parts program and a warning message can be generated by the device in the case where the actual configuration does not conform to the simulated configuration.

According to another advantageous feature of the present invention, the machining operation may be initiated if the actual configuration and the simulated configuration conform, whereas the machining operation may not be initiated if the actual configuration and the simulated configuration do not conform, because damage to the machine tool and/or the production of faulty workpieces, for example, can be reliably avoided by this measure.

According to another advantageous feature of the present invention, the simulated configuration may be stored in encrypted form in the parts program and subsequently decrypted. This prevents the possibility of manipulating the simulated configuration stored in the parts program.

According to another advantageous feature of the present invention, at least parts of the actual configuration may be determined using an image acquisition device and/or a sensor and/or a measuring device. The actual configuration can then be automatically determined.

According to another advantageous feature of the present invention, the actual configuration may be available in form of data relating to the tool-equipment and/or the blanks and/or the tool clamping pieces and/or the actual configuration may be available in form of the software configuration. Such a form of the actual configuration represents a typical form of the actual configuration of a machine tool.

According to another advantageous feature of the present invention, the parts program may be generated by simulating the machining operation using a simulated configuration of the machine tool and a parts program in which the simulated configuration has not yet been stored, and by subsequently storing the simulated configuration in that parts program. A parts program in which the simulated configuration is stored can thereby be generated in a simple fashion.

According to another advantageous feature of the present invention, the simulated configuration may be stored in an encrypted form because this prevents later manipulation of the simulated configuration in the parts program.

According to another advantageous feature of the present invention, the machining operation may be initiated by the device if the actual configuration and the simulated configuration conform, whereas the machining operation may not be initiated by the device if the actual configuration and the simulated configuration do not conform, because damage to the machine tool and/or the production of faulty workpieces, for example, can be reliably prevented with this measure.

According to another advantageous feature of the present invention, the simulated configuration may be stored in the parts program in an encrypted form and that it can be decrypted by the device. This prevents the possibility of manipulating the simulated configuration stored in the parts program.

According to another advantageous feature of the present invention, at least parts of the actual configuration may be determined by the device using an image acquisition device and/or a sensor and/or a measuring device. The actual configuration can thereby be automatically determined.

According to another advantageous feature of the present invention, the actual configuration may be available in form of data relating to the tool-equipment and/or the blanks and/or the tool clamping pieces and/or the actual configuration is available in form of the software configuration. Such a form of the actual configuration represents a typical form of the actual configuration of a machine tool.

Furthermore, the device may advantageously be designed such that the parts program is generated by the device by simulating the machining operation, using a simulated configuration of the machine tool and a parts program in which the simulated configuration has not yet been stored, wherein the simulated configuration is subsequently stored in the parts program in which the simulated configuration has not yet been stored. A parts program in which the simulated configuration is stored can then be generated in a simple fashion.

According to another advantageous feature of the present invention, the simulated configuration may be stored in the parts program in an encrypted form because this prevents later manipulation of the simulated configuration in the parts program.

Advantageously, a machine tool may be designed which includes the device according to the invention.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 1 shows a device according to the invention for operating a machine tool;

FIG. 2 shows a method according to the invention for operating a machine tool; and FIG. 3 shows a parts program according to the invention.

DETAILED DESCRIPTION OF PREFERRED EMBODIMENTS

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown in a schematic illustration the device according to the invention in form of a block diagram. It is customary to initiate the manufacturing process of a workpiece to be produced by modeling the workpiece using a CAD (Computer-Aided Design) system 1. The geometry-related data of the workpiece determined as such using the CAD system 1 is transferred as an input variable to a CAM (Computer-Aided Manufacturing) system 3, as indicated by arrow 2. Using the CAM system 3, the milling paths (in the case of an exemplary milling operation) are determined from the geometry-related data of the workpiece to be produced and the later configuration of the machine tool, as well as from the geometry-related data of a blank which forms the starting part for the later machining operation by the machine tool, wherein these milling paths have to be traversed by the machine axes of the machine tool to manufacture the workpiece to be produced from the blank. In this way, the movements of the machine axes required to manufacture the workpiece are determined by the CAM system 3 and are made available as input variables for a so-called postprocessor 5, as indicated in FIG. 1 by arrow 4.

The postprocessor 5, which is present in form of a program being executed on a computer, generates from the movements of the machine axes determined by the CAM system and the later configuration of the machine tool a parts program, in particular an NC parts program, by means of which the control device of the machine tool later controls the machining operation of the machine tool, in order to manufacture the workpiece from the blank.

The parts program is generally present in form of a file containing commands generally written in DIN code which are arranged line after line in ASCII code. Such command (e.g. G3 X115 Y113.3 I-43 J25.52) may, for example, involve moving a tool (e.g. a milling cutter) along segment of a circle to a target position in order to, for example, mill a recess into the blank. The individual commands of the parts program are later read by the control device 9 of the machine tool. The control device 9 calculates the intended position values $Xsoll_n$ for each drive n of the drive system 10 of the machine tool according to the commands of the parts program.

However, for safety reasons, it is customary in commercial applications to transfer the parts program, after it has been generated by the postprocessor 5, to a simulation unit 7 which can for be, example, in form of a simulation program running on a computer, as indicated by arrow 6. The simulation unit 7, which includes a model of the machine tool which is more or less true in detail, simulates the later real machining operation, wherein the parts program generated by the postprocessor 5 is checked as to whether, for example, collisions of machine elements amongst themselves or with the blank occur during the machining operation, and/or whether the intended machining times and machining precision are met. If the simulation is completed successfully, i.e., if the machining operation runs without errors and has the desired outcome, then the parts program tested in this manner is transmitted to the control device 9, indicated in FIG. 1 by arrow 8, and the real machining operation of the machine tool can be initiated.

However, in practice, errors nevertheless occur frequently in the machining operation which damages machine elements of the machine tool or results in an inadequate quality of the workpiece, for example with respect to manufacturing precision. The reason for this is often found in the fact that the configuration of the machine tool used by the simulation unit 7 during the simulation (referred to as simulated configuration below) does not conform to the later occurring actual configuration of the real machine tool. For example, the simulation can be carried out using a simulated configuration of the machine tool which assumes that a drill with a diameter of 8 mm is present at a particular location of the tool holder of the tool changer, whereas in actuality a drill with a cross section 10 is later present at that particular location in the real machine tool.

At this point, the method according to the invention sets in. According to the invention, the simulated configuration, i.e., the configuration of the machine tool used in the simulation, is stored in the parts program by the simulation unit 7 in the parts program which was generated by the postprocessor 5. The simulation unit 7 thereby generates a parts program in which the machining operation is simulated, using a simulated configuration of a machine tool and a parts program in which the simulated configuration is not yet stored, and in which the simulated configuration is subsequently stored in the parts program. The parts program 24 generated in this manner is illustrated in FIG. 3. In this manner, the parts program 24 consists of the commands 25 of the parts program from the postprocessor 5 and of the simulated configuration 18. The parts program 24 is generally available as a file which comprises the commands 25 and the simulated configuration 18. In this case, the simulated configuration 18 is stored in the parts program by, for example, saving the simulated configuration 18 to the file.

According to the invention, the control device 9 of the machine tool determines the actual configuration of the machine tool before initiating the machining operation of the machine tool, for example by using an image acquisition device 11 built into the machine tool, a sensor 12 and/or a measuring device 13 integrated into the machine tool. Using the image acquisition device 11, which can for example be in form of a camera, the present position of tool clamping pieces (tool clamping piece data) and the position of the blank (blank data) can be detected, for example. The sensor 12 can for example detect the equipment of tools in the tool changer. The measuring device 13 can for example detect the dimensions of the blank. After the actual configuration of the machine tool was determined in an automated fashion in this manner, the actual configuration is compared to the simulated configuration 18 of the machine tool stored in the parts program, whereupon a warning message W is generated if the actual configuration and the simulated configuration do not conform and this warning message is transmitted to an operating unit 14 for example; this operating unit 14 displays the warning message for the operator. The machining operation is only initiated by the control device 9 if the actual configuration and the simulated configuration conform. Within the scope of the exemplary embodiment, the simulated configuration is stored by the simulation unit 7 in an encrypted form in the parts program 24, and the control device 9 decrypts the simulated configuration 18 stored in the parts program before it compares the actual configuration with the simulated configuration. This can reliably prevent later manipulation of the simulated configuration stored in the parts program.

Furthermore, the actual configuration, determined in an automated fashion, is advantageously transferred to the CAM system 3 and/or the postprocessor 5 and/or the simulation unit 7, as indicated by arrows 16. Determining and/or adapting the configuration of the machine tool used in the CAM system, postprocessor and during the simulation manually can thus be eliminated.

The device for operating a machine tool can in the simplest case merely be designed as a control device 9 for controlling the machine tool, without the simulation unit 7.

However, the device for operating a machine tool can also be designed as a system which includes the control device 9 and a structurally separate computer, installed in an office for example, on which the simulation unit 7 is run in form of a simulation program. However, the device for operating the machine tool may also be available in form of the control device 9, and the simulation unit 7, implemented for example as a program, may be run on the control device 9 and thus is an integral component of the control device 9.

The control device 9 can be designed, for example, as a numerically controlled control (NC control).

FIG. 2 illustrates once more the method according to the invention schematically in form of a flow chart. The parts program 19, which at this point in time does not include a simulated configuration, is tested in a simulation 17 by taking into account the simulated configuration 18, and a parts program 24 is generated in which the simulated configuration 18 is stored. Subsequently, the actual configuration 26 of the machine tool is determined 20, and the actual configuration 26 is subsequently compared 21 with the simulated configuration. If the actual configuration does not conform to the simulated configuration, a warning message is generated 22. If the actual configuration conforms to the simulated configuration, the machining operation is initiated 23.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A method for operating a machine tool having an initial machine configuration, comprising the steps of:
   generating a parts program for controlling a machining operation of the machine tool having the initial machine configuration by simulating the machining operation with a simulated configuration of the machine tool and a parts program in which the simulated configuration is not yet stored, said parts program fixedly associated with the initial machine configuration,
   transmitting the parts program to a simulation unit which has stored therein a replication of the initial machine configuration of the machine tool as the simulated machine configuration,
   testing the parts program with the simulated machine configuration,
   storing the simulated machine configuration of the machine tool in the parts program by replacing the parts program in which the simulated configuration was not yet stored,
   determining an actual machine configuration of the machine tool,
   comparing the actual machine configuration with the simulated machine configuration stored in the parts program, and
   generating a warning message and preventing operation of the actual machine configuration with the parts program having the simulated machine configuration if the actual machine configuration is not in conformance with the simulated machine configuration.

2. The method of claim 1, comprising the steps of starting the machining operation if the actual configuration and the simulated configuration are in conformance, and aborting a start of the machining operation if the actual configuration and the simulated configuration are not in conformance.

3. The method of claim 1, wherein the simulated configuration is stored in the parts program in an encrypted form and is subsequently decrypted.

4. The method of claim 1, further comprising the step of determining at least parts of the actual configuration with an image acquisition device or a sensor or a measuring device, or a combination thereof.

5. The method of claim 1, wherein the actual configuration comprises data relating to tool-equipment or blanks or a tool clamping device or a software configuration.

6. The method of claim 1, wherein the simulated configuration is stored in an encrypted form.

7. A device for operating a machine tool having an initial machine configuration, comprising a parts program executed in the device for control of a machining operation of the machine tool, wherein the device is configured to transmit the parts program, which is fixedly associated with the initial machine configuration, to a simulation unit which has stored therein a replication of the initial machine configuration of the machine tool as a simulated machine configuration, simulate the machining operation with the simulated configuration of the machine tool and with a parts program in which the simulated configuration is not yet stored, test the parts program with the simulated machine configuration, store the simulated machine configuration of the machine tool in the parts program by replacing the parts program in which the simulated configuration was not yet stored, determine an actual machine configuration of the machine tool and to compare the actual machine configuration with a simulated configuration of the machine tool stored in the parts program, the device further configured to generate a warning message and prevent operation of the actual machine configuration with the parts program having the simulated machine configuration if the actual configuration is not in conformance with the simulated machine configuration.

8. The device of claim 7, wherein the simulated configuration is stored in the parts program in an encrypted form.

9. The device of claim 7, wherein the machining operation is started by the device if the actual configuration and the simulated configuration are in conformance, and the machining operation is aborted by the device if the actual configuration and the simulated configuration are not in conformance.

10. The device of claim 7, wherein the simulated configuration is stored in the parts program in an encrypted form and is decrypted by the device.

11. The device of claim 7, further comprising an image acquisition device or a sensor or a measuring device, or a combination thereof, for determining at least parts of the actual configuration.

12. The device of claim 7, wherein the actual configuration comprises data relating to tool-equipment or blanks or a tool clamping device or a software configuration.

13. A machine tool comprising a device for operating the machine tool having an initial machine configuration, the device comprising a parts program executed in the device for control of a machining operation of the machine tool, wherein the device is configured to transmit the parts program which is fixedly associated with the initial machine configuration, to a simulation unit which has stored therein a replication of the initial machine configuration of the machine tool as a simulated machine configuration, simulate the machining operation with the simulated configuration of the machine tool and with a parts program in which the simulated configuration is not yet stored, test the parts program with the simulated machine configuration, store the simulated machine configuration of the machine tool in the parts program by replacing the parts program in which the simulated configuration was not yet stored, determine an actual machine configuration of the machine tool and to compare the actual machine configuration with a simulated configuration of the machine tool stored in the parts program, the device further configured to generate a warning message and prevent operation of the actual machine configuration with the parts program having the simulated machine configuration if the actual configuration is not in conformance with the simulated machine configuration.

* * * * *